United States Patent [19]
Gompertz et al.

[11] Patent Number: 5,742,306
[45] Date of Patent: Apr. 21, 1998

[54] IMAGING CARTRIDGE SYSTEM FOR INKJET PRINTING MECHANISMS

[75] Inventors: Ronald S. Gompertz, Camas; Mark S. Hickman; Michael D. Dobbs, both of Vancouver, all of Wash.

[73] Assignee: Hewlett-Packard Company, Palo Alto, Calif.

[21] Appl. No.: 508,435

[22] Filed: Jul. 31, 1995

[51] Int. Cl.⁶ .............................. B41J 2/21; B41J 29/38
[52] U.S. Cl. .................................. 347/43; 347/14
[58] Field of Search ........................ 347/43, 40, 9, 347/15, 100, 14, 50

[56] References Cited

U.S. PATENT DOCUMENTS

| | | |
|---|---|---|
| 4,672,432 | 6/1987 | Sakurada et al. . |
| 4,755,836 | 7/1988 | Ta et al. . |
| 4,803,500 | 2/1989 | Millbrandt . |
| 4,872,026 | 10/1989 | Rasmussen et al. . |
| 4,872,027 | 10/1989 | Buskirk et al. . |
| 5,070,413 | 12/1991 | Sullivan et al. ............... 358/456 |
| 5,142,374 | 8/1992 | Tajika et al. ............... 347/15 |
| 5,208,610 | 5/1993 | Su et al. . |
| 5,241,325 | 8/1993 | Nguyen . |
| 5,250,956 | 10/1993 | Haselby et al. . |
| 5,366,305 | 11/1994 | Christianson . |
| 5,392,063 | 2/1995 | Rhoads . |
| 5,428,377 | 6/1995 | Stoffel et al. . |
| 5,428,383 | 6/1995 | Shield et al. ............... 347/96 |
| 5,461,482 | 10/1995 | Wilson et al. ............... 347/50 |

FOREIGN PATENT DOCUMENTS

606022A1  12/1993  European Pat. Off. .

*Primary Examiner*—Benjamin R. Fuller
*Assistant Examiner*—Thinh Nguyen
*Attorney, Agent, or Firm*—Flory L. Martin

[57] ABSTRACT

An imaging inkjet cartridge system for an inkjet printing mechanism provides near photographic image quality, as well as crisp black text and line art. In a multi-pen carriage, typically for a tri-chamber full color (e.g. cyan, magenta and yellow) cartridge and a monochrome (e.g. black) cartridge, the monochrome cartridge may be replaced with an imaging inkjet cartridge. The full color cartridge carries full colorant concentrations of inks, while the imaging cartridge carries ink formulations having reduced colorant concentrations, such as cyan and magenta, with either a full or a reduced colorant concentration of black ink. The carriage may also carry all three cartridges (full color, black and imaging). Pens containing other color and concentration combinations may also be interchanged. A method is provided of retrofitting or upgrading an inkjet printing mechanism by replacing or interchanging cartridges, such as by replacing the monochrome cartridge with an imaging inkjet cartridge.

39 Claims, 3 Drawing Sheets

IMAGING CARTRIDGE SYSTEM FOR INKJET PRINTING MECHANISMS

FIELD OF THE INVENTION

The present invention relates generally to inkjet printing mechanisms, and more particularly to an imaging inkjet cartridge system that provides near photographic image quality, as well as crisp black text and line art.

BACKGROUND OF THE INVENTION

Inkjet printing mechanisms use inkjet cartridges, often called "pens," which shoot drops of liquid colorant, referred to generally herein as "ink," onto a page. Each pen has a printhead formed with very small nozzles through which the ink drops are fired. To print an image, the printhead is propelled back and forth across the page, shooting drops of ink in a desired pattern as it moves. The particular ink ejection mechanism within the printhead may take on a variety of different forms known to those skilled in the art, such as those using piezo-electric or thermal printhead technology. For instance, two earlier thermal ink ejection mechanisms are shown in U.S. Pat. Nos. 5,278,584 and 4,683,481, both assigned to the present assignee, Hewlett-Packard Company. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text).

To clean and protect the printhead, typically a "service station" mechanism is mounted within the printer chassis so the printhead can be moved over the station for maintenance. For storage, or during non-printing periods, the service stations usually include a capping system which hermetically seals the printhead nozzles from contaminants and drying. Some caps are also designed to facilitate priming, such as by being connected to a pumping unit or other mechanism that draws a vacuum on the printhead. During operation, clogs in the printhead are periodically cleared by firing a number of drops of ink through each of the nozzles in a process known as "spitting," with the waste ink being collected in a "spittoon" reservoir portion of the service station. After spitting, uncapping, or occasionally during printing, most service stations have an elastomeric wiper that wipes the printhead surface to remove ink residue, as well as any paper dust or other debris that has collected on the face of the printhead.

To improve the clarity and contrast of the printed image, recent research has focused on improving the ink itself. To provide faster, more waterfast printing with darker blacks and more vivid colors, pigment based inks have been developed. These pigment based inks have a higher solid content than the earlier dye based inks, which results in a higher optical density for the new inks. Both types of ink dry quickly, which allows inkjet printing mechanisms to form high quality images on readily available and economical plain paper.

Early inkjet printers used a single monochromatic pen, typically carrying black ink. Later generations of inkjet printing mechanisms used a black pen which was interchangeable with a tri-color pen, typically one carrying the colors of cyan, magenta and yellow within a single cartridge. The tri-color pen was capable of printing a "process" or "composite" black image, by depositing a drop of cyan, a drop of magenta and a drop of yellow all at the same location. Unfortunately, images printed with the composite black usually had rough edges, and the overall image, even the color portions, often had a non-black hue or cast, depending for instance, upon the type of paper used.

The next generation of printers further enhanced the images by using a dual pen system. These dual pen printers provided a black pen along with a tri-color pen, both of which were mounted in a single carriage. These dual pen devices had the ability to print crisp, clear black text while providing full color images. As another answer to the dissatisfaction with the composite black images, a quad pen printing mechanism was developed. These quad pen printers carried four cartridges in a single carriage. Quad pen plotters were also developed, some of which carried four cartridges, one in each of four carriages. These quad printing mechanisms had a first pen carrying black ink, a second pen carrying cyan ink, a third pen carrying magenta ink, and a fourth pen carrying yellow ink.

Unfortunately, both the quad pen printers and the dual pen printers produced images, such as photographic images, which had a "grainy" appearance. For example, when printing a light colored portion of an image, such as a flesh tone, yellow dots were printed and lightly interspersed with magenta dots. When viewed at a distance, these magenta dots provided a flesh tone appearance; however, upon closer inspection the magenta dots were quite visible, giving the image an undesirable grainy appearance. This grainy appearance was similar to the graininess seen in newspaper photographs, or in photos taken using the wrong speed ("ASA" or "ISO" rating) of photographic film in low light conditions.

Indeed, inkjet printing mechanisms are known as "binary drop devices" because they form images by either placing a drop of ink on the print medium or by not firing. Not firing a droplet leaves either the print medium, or a previously printed drop(s), exposed to view. Unfortunately, such binary drop devices give inherently grainy images due to the visual "step" between the "drop on" and "drop off" regions. Worse yet, the larger the drops printed, the more grainy the resulting image appears, whether printing color or gray-scale images.

Thus, the earlier inkjet printers, while providing crisp black text and bright vivid graphics and charts, failed to provide images of near photographic type quality, such as portraits, scenic landscapes, and other natural appearing images. Other devices have been used to provide high quality images, such as continuous tone devices, for instance, those using a dye sublimation processes. Unfortunately, these continuous tone devices are expensive, and very unlikely to be viable within the small office and home printer markets, which currently sell printers to consumers within the range of $200–$1,000 dollars.

SUMMARY OF THE INVENTION

One aspect of the present invention addresses the grainy image problem by providing an inkjet printing mechanism with at least two inkjet cartridges comprising either a first cartridge or a second cartridge, and a third cartridge. The first, second and third cartridges are responsive to first, second and third firing signals, respectively. The first and second cartridges contain at least one different ink formulation. The printing mechanism also has a carriage that receives the third cartridge, and that interchangeably receives the first cartridge or the second cartridge. The printing mechanism has a controller that generates the third firing signal. The controller also determines whether either the first cartridge or the second cartridge is installed in the carriage. The controller then generates the first firing signal when the first cartridge is installed, or the second firing signal when the second cartridge is installed.

According to another aspect of the invention, a method is provided of retrofitting an inkjet printing mechanism having a carriage that carries first and second cartridges. The first cartridge carries a first ink formulation and is responsive to a first firing signal. The method includes the step of replacing the first cartridge in the carriage with a third cartridge. The third cartridge contains a third ink formulation and is responsive to a third firing signal. In a recognizing step, the replacement of the first cartridge with the third cartridge is recognized. In response to the recognizing step, in a generating step, the third firing signal is generated for the third cartridge.

An overall goal of the present invention is to provide an inkjet printing mechanism which provides crisp black text and line art, bold color graphics and realistic images of near continuous-tone photographic quality, using a binary drop technology.

A further goal of the present invention is to provide a method of recording realistic photographic type images on plain paper using an inkjet printer.

Another goal of the present invention is to provide a retrofit system and method for upgrading a printing mechanism with an imaging inkjet cartridge system that provides near photographic image quality, while still retaining the option of using the original black and full-color cartridges for a faster print speed and crisper black edges when printing text or business graphics on plain paper.

DETAILED DESCRIPTION OF THE PREFERRED EMBODIMENTS

Figure 1:
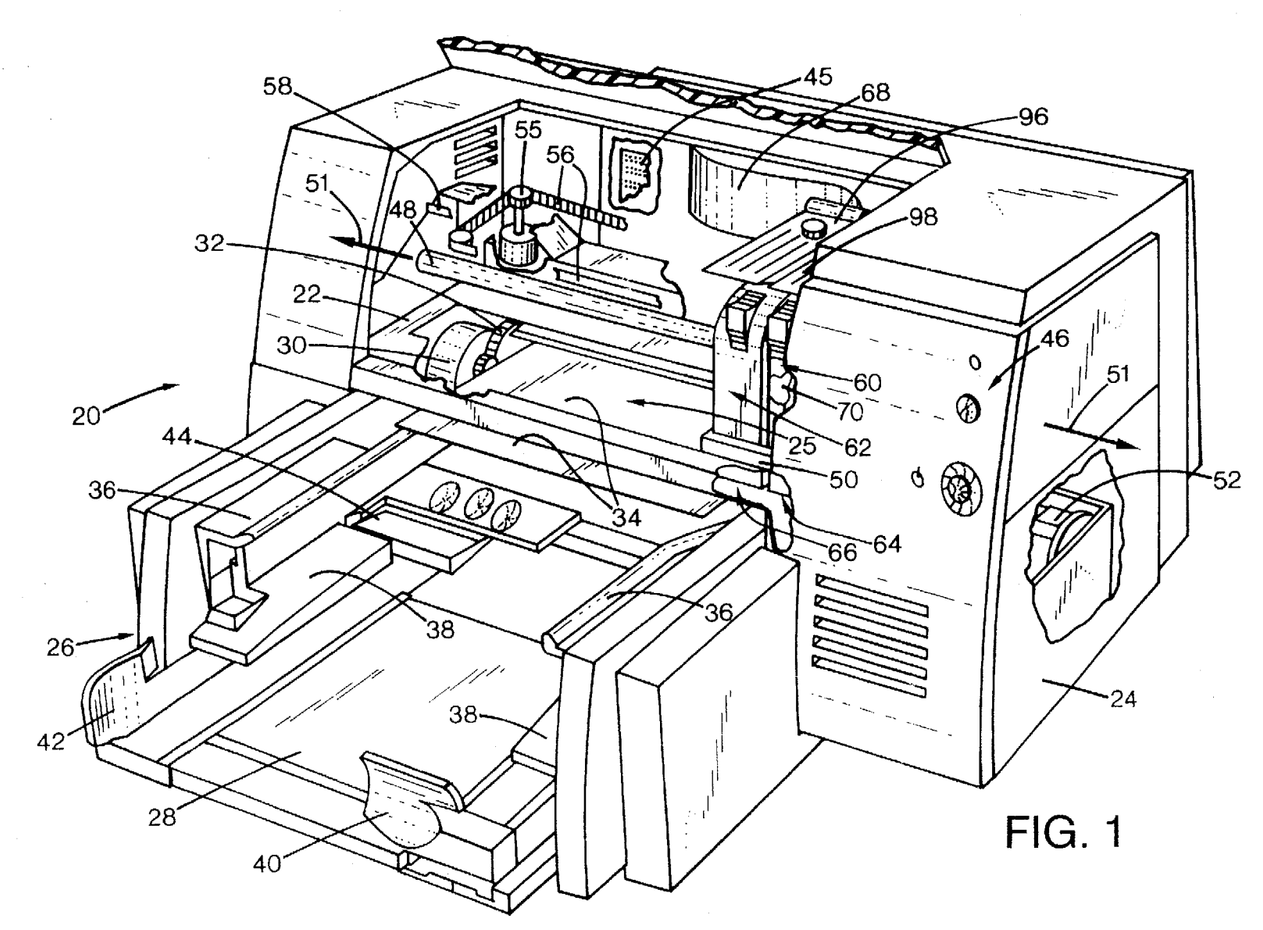
FIG. 1 is a fragmented, partially schematic, perspective view of one form of an inkjet printing mechanism employing one form of an imaging cartridge system of the present invention.

FIG. 1 illustrates an embodiment of an inkier printing mechanism, here shown as an inkjet printer 20, constructed in accordance with the present invention, which may be used for printing for business reports, correspondence, desktop publishing, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few. For convenience the concepts of the present invention are illustrated in the environment of an inkjet printer 20.

While it is apparent that the printer components may vary from model to model, the typical inkjet printer 20 includes a chassis 22 surrounded by a housing or casing enclosure 24, typically of a plastic material. Sheets of print media are fed through a print zone 25 by a print media handling system 26.

The print media may be any type of suitable sheet material, such as paper, card-stock, fabric, transparencies, mylar, and the like, but for convenience, the illustrated embodiment is described using paper as the print medium. The print media handling system 26 has a feed tray 28 for storing sheets of paper before printing. A series of conventional paper drive rollers (not shown), driven by a stepper motor 30 and a drive gear assembly 32, may be used to move the print media from tray 28 into the print zone 25, as shown for sheet 34, for printing.

After printing, the motor 30 drives the printed sheet 34 onto a pair of retractable output drying wing members 36. The wings 36 momentarily hold the newly printed sheet above any previously printed sheets still drying in an output tray portion 38 before retracting to the sides to drop the newly printed sheet into the outpost tray 38. The media handling system 26 may include a series of adjustment mechanisms for accommodating different sizes of print media, including letter, legal, A-4, envelopes, etc., such as a sliding length adjustment lever 40, a sliding width adjustment lever 42, and a sliding envelope feed plate 44.

The printer 20 also has a printer controller, illustrated schematically as a microprocessor 45, that receives instructions from a host device, typically a computer, such as a personal computer (not shown). The printer controller 45 may also operate in response to user inputs provided through a key pad 46 located on the exterior of the casing 24. A monitor coupled to the computer host may be used to display visual information to an operator, such as the printer status or a particular program being run on the host computer. Personal computers, their input devices, such as a keyboard and/or a mouse device, and monitors are all well known to those skilled in the art.

A carriage guide rod 48 is supported by the chassis 22 to slideably support an inkjet carriage 50 for travel back and forth, reciprocally, across the print zone 25 along a scanning axis 51. One suitable type of carriage support system is shown in U.S. Pat. No. 5,366,305, assigned to Hewlett-Packard Company, the assignee of the present invention. The carriage 50 is also propelled along guide rod 48 into a servicing region housing a service station 52, located within the interior of the casing 24. The service station 52 may be any type of servicing device, sized to service the particular printing cartridges used in a particular implementation. Service stations, such as those used in commercially available printers, typically include wiping, capping and priming devices, as well as a spittoon portion, as described above in the background portion. One suitable preferred service station is commercially available in the DeskJet® 850C color inkjet printer, produced by Hewlett-Packard Company, the present assignee.

The printer 20 also has a carriage drive gear and DC motor assembly 55, both coupled to drive an endless belt 56. The motor 55 operates in response to control signals received from the printer controller 45. The belt 56 may be secured in a conventional manner to the pen carriage 50 to incrementally advance the carriage along guide rod 48 in response to rotation of motor 55. To provide carriage positional feedback information to printer controller 45, an encoder strip 58 extends along the length of the print zone 25 and over the service station 52. A conventional optical encoder reader may also be mounted on the back surface of printhead carriage 50 to read positional information provided by the encoder strip 58. The manner of attaching the belt 56 to the carriage, as well as the manner providing positional feedback information via the encoder strip reader, may be accomplished in a variety of different ways known to those skilled in the art.

In the print zone 25, the media sheet 34 receives ink from an inkjet cartridge, such as a monochrome black ink cartridge 60 and/or a color ink cartridge 62. The cartridges 60 and 62 are also often called "pens" by those in the art. The illustrated color pen 62 is a tri-compartment, tri-color pen, although in some embodiments, a set of discrete monochrome pens may be used. While the color pen 62 may contain a pigment based ink, for the purposes of illustration, pen 62 is described as containing three dye based ink colors, such as cyan, yellow and magenta. The black ink pen 60 is illustrated herein as containing a pigment based ink. It is apparent that other types of inks may also be used in pens 60, 62, such as paraffin based inks, as well as hybrid or composite inks having both dye and pigment characteristics.

The illustrated pens 60, 62 each include reservoirs for storing a supply of ink, and printheads 64, 66 respectively, for selectively ejecting the ink. While the black and color pens may be of different sizes, in the illustrated embodiment, the pens 60, 62 are of substantially the same size. The monochrome black pen 60 has a single reservoir 70 containing black ink, whereas the full color pen 62 has three reservoirs 72, 74 and 76 for carrying the cyan, magenta and yellow inks (see FIG. 2). The black printhead 64 is in fluid communication with the black reservoir 70. The full color printhead 66 has three sets of nozzles, with each set in fluid communication with an associated one of the reservoirs 72, 74, 76.

Each printhead 64, 66 has an orifice plate with a plurality of nozzles formed therethrough in a manner well known to those skilled in the art. The illustrated printheads 64, 66 are thermal inkjet printheads, although other types of printheads may be used, such as piezoelectric printheads. The printheads 64, 66 typically include substrate layer having a plurality of resistors which are associated with the nozzles. Upon energizing a selected resistor, a bubble of gas is formed to eject a droplet of ink from the nozzle and onto sheet 34 in the print zone 25. Ink may also be ejected into a spittoon portion of the service station 52 during servicing, or to clear plugged nozzles. The printhead resistors are selectively energized in response to firing command control signals delivered by a multi-conductor strip 68 from the controller 45 to the printhead carriage 50.

Imaging Cartridge System

Figure 2:
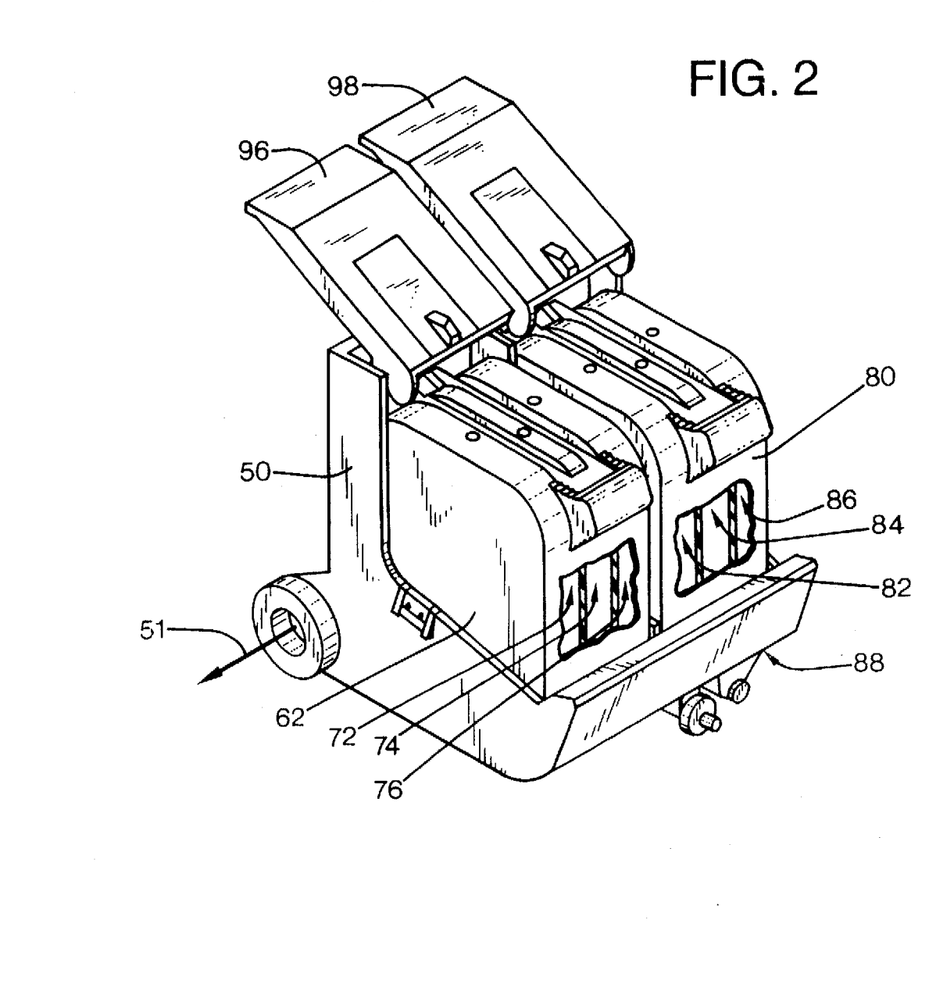
FIGS. 2 and 3 are perspective views of alternate embodiments of the cartridge system of FIG. 1, illustrating two different carriage embodiments.

FIG. 2 shows the printhead carriage 50 holding the color pen 62 and an imaging cartridge 80, retrofitted in place of the black ink cartridge 60. Of course, some printing mechanisms may be constructed to receive only the color pen 62 and the imaging cartridge 80, without the interchangeability feature. In the illustrated embodiment, the imaging cartridge 80 comprises a tri-compartment foam-filled cartridge having three ink-containing chambers or reservoirs 82, 84, 86, which may be of the same general construction as the full color cartridge 62. The imaging cartridge 80 has a printhead 88, which may be constructed as described above for printhead 64 to include three nozzle sets, each in fluid communication with an associated reservoir 82, 84, 86.

In contrast with the full color pen 62, the imaging cartridge 80 is a reduced colorant concentration cartridge. While the imaging cartridge reservoirs 82, 84, 86 preferably have the same amount of solvent or carrier as pen 62, the amount of colorant in each chamber is less than the amount of colorant in the color pen chambers 72, 74, 76. Since the illustrated color inks for pens 62 and 80 is a dye-based ink formulation, this colorant concentration may be also referred to by those skilled in the art as the "colorant concentration" of the pen. The black ink contained within pen 70 is illustrated as a pigment-based ink, which may also be reduced in colorant concentration by maintaining the same amount of solvent or carrier for a given pen capacity while reducing the amount of pigment in the concentration. For instance, the first imaging reservoir 82 may contain only 10–30% of the full colorant concentration of cyan in chamber 72, while the second imaging reservoir 84 contains only 10–30% of the normal colorant concentration of magenta in chamber 74.

The third imaging cartridge chamber 86 may carry either a full or a reduced colorant concentration of black ink, that is, either a 100% colorant concentration, or 3–15%, for instance, of the colorant concentration in the black reservoir 70. While a full colorant concentration of black ink in the imaging cartridge 80 is advantageous for printing clear, crisp black text, the reduced colorant concentration black provides better, photographic-type images. Note that the colors of cyan and magenta have been chosen for reduced colorant concentrations in the imaging pen 80, rather than yellow. This is because visually, yellow is a low contrast color, and any graininess of the yellow ink is not visually detectable to the human eye. Therefore, in many implementations, there is no need for a reduced colorant concentration of yellow ink. Yet, in other embodiments, the third chamber may contain an ink formulation of either a reduced or full concentration of yellow colored ink. For instance, a reduced yellow concentration may enhance transition regions in areas of flesh tones. However, use of the reduced colorant concentration imaging pen 80 without yellow has been found to significantly enhance the visual appearance of light tones and mid-tones in photographic type images, particularly when compared to the earlier dual pen printers, which had only a full colorant concentration tri-color pen and a black pen.

For the printer 20 and controller 45 to distinguish whether the black pen 60 or the imaging pen 80 is installed in carriage 50, the black and imaging pens 60, 80 each include an identification scheme. For instance, the pens 60, 80 may each include a unique identifier for automatic recognition by the system, such as a distinct binary code and/or resistors of different resistances. These identifiers are decodeable by the software or firmware of the printer controller 45, and/or the software of a printer driver, located in a host computer or device which communicates with printer 20. One suitable identification scheme for interchangeable printheads is disclosed in U.S. Pat. No. 4,872,027, also assigned to the present assignee, Hewlett-Packard Company. Alternatively, an operator may indicate which cartridge is installed, by making an appropriate entry into a host computer or by merely pressing a button on the keypad 46. Upon communication of which of the interchangeable pens 60 or 80 is located in carriage 50, the software driver within the host computer or printer then uses an appropriate rendering scheme suitable to which ever pen is installed. The printer controller 45 then employs suitable print modes and control parameters to generate firing signals that are communicated via strip 68 through the carriage 50 to properly fire either the black pen 60 or the imaging cartridge 80.

Retrofitting the carriage 50 with the imaging cartridge 80, instead of the black ink cartridge 60 advantageously allows for achieving near-photographic image print quality. This retrofit capability may be desirable to some consumers who want a dual personality printer. For example, many consumers typically print text or simple business graphics, in which case a dual pen printer having only black and full color pens 60, 62 provides faster print speed and crisper black text. Yet these same consumers sometimes want to upgrade to their hardcopy output to have near-photographic image quality, which may be accomplished using the imaging cartridge 80. In the illustrated embodiment, using the imaging cartridge 80 and the full color cartridge 60 in carriage 50 allows the carriage to carry six reservoirs holding six varying colorant concentrations of different colors and intensities, as compared to the earlier printers which had a total of only four chambers carrying a maximum of four different colors.

Figure 3:
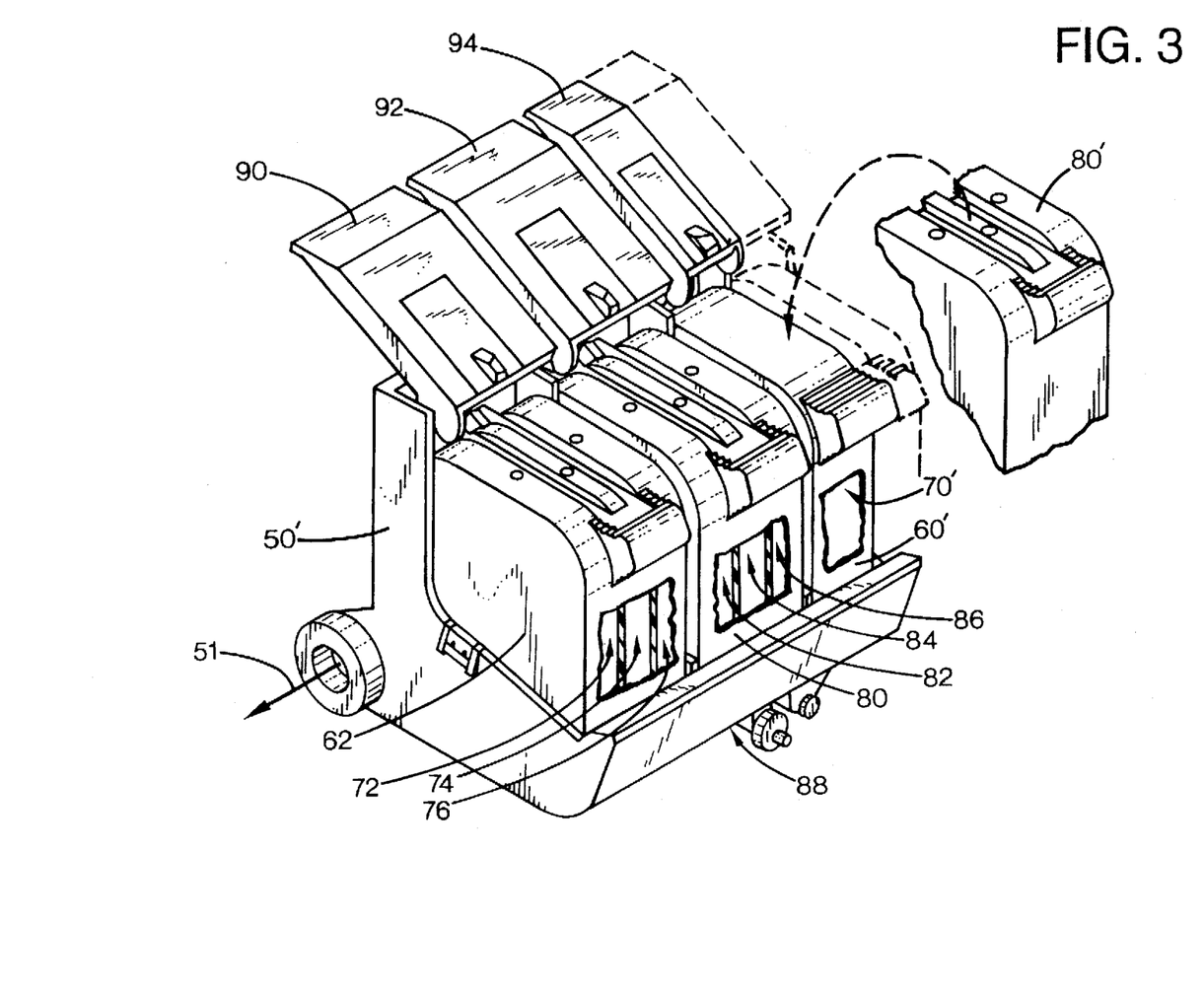

FIG. 3 illustrates an alternate embodiment of a superior imaging system configuration constructed in accordance with the present invention. The imaging system illustrated in FIG. 3 has a printhead carriage 50' which is substantially of the same construction as carriage 50, but longer in the direction of scanning axis 51, to accommodate a black ink cartridge 60'. The black pen 60' is of slightly reduced width from that shown for the black ink cartridge 60 in FIG. 1. In FIG. 3, the longer carriage 50' is shown with levers, latches or lid members 90, 92 and 94 in an open condition to show placement of the respective color, imaging and black pens 62, 80 and 60'. Similarly in FIG. 2, the retrofitted carriage 50 is shown with two cartridge-securing levers, latch or lid mechanisms 96, 98 in an open position, rather than closed as shown in FIG. 1.

In this tri-cartridge embodiment, the carriage 50' carries seven reservoirs, with three reservoirs carrying full colorant concentrations of cyan, magenta and yellow for the full color pen 62, reduced colorant concentrations of cyan, magenta and black for the imaging cartridge 80, and a full black colorant concentration for the black pen 60'. Alternatively, the imaging cartridge may contain reduced colorant concentrations of cyan, magenta and yellow if desired for some special imaging uses, such as for the extensive printing of portraits having a need for smoother blending of flesh tones. Use of the narrower black pen 60' (that is, narrower than pen 60 in FIG. 1, which is substantially the same width as the tri-compartment pen 80) advantageously allows for a smaller width or "footprint" for printer 20. The term "footprint" refers to the amount of work space required to physically receive the printer 20, which can be an important consideration for some consumers. It is apparent, however, that the carriage 50' may also be made longer to accommodate a wider black pen, such as pen 60 shown in FIG. 1. While FIG. 2 illustrates a black pen 60 which is of the same width as the imaging cartridge 80, it is also apparent that a reduced width pen, such as pen 60', may be used instead of pen 60, by modifying the carriage 50 to interchangeably receive either a wide or a narrow cartridge. One example of such a system for interchangeably accommodating narrow and wider pens is disclosed in U.S. Pat. No. 5,208,610, assigned to the present assignee Hewlett-Packard Company. The imaging system shown in FIG. 3 is preferably more suitable for a permanent installation, whereas that of FIG. 2 may be more suitable for a retrofit or upgrade situation, or in some implementations for a permanent system.

The imaging systems described above with respect to FIGS. 2 and 3 may be modified to accomplish a variety of different objectives. For instance, the drop volumes may be varied, particularly for the reduced colorant concentration printheads to achieve cost improvement. For instance, by reducing the drop volume, less ink is used, which reduces the cost per page printed. While the imaging pen 80 has been illustrated as a tri-chamber cartridge, it is apparent that these concepts may be extended to other multi-chamber pens, such as a quad-chamber pen having four chambers. This may be a particularly suitable arrangement for some implementations, such as: a quad-chamber imaging pen containing reduced colorant concentrations of cyan, magenta and yellow, with a full concentration of true black; or a quad-chamber imaging pen containing reduced colorant concentrations of cyan and magenta, a gray color (reduced concentration of black colorant), and a full concentration of true black. It may also be useful to include a multi-chamber cartridge having ink formulations of "primary" colors, such as red, green and blue, either at full or reduced colorant concentrations. Such a primary color pen in combination with the traditional cyan, magenta, yellow pen may result in ink savings over the systems described with respect to FIGS. 2 and 3, above.

As another variation, the three-pen carriage 50' shown in FIG. 3 may be modified to carry three tri-chamber pens for a total of nine printheads and inks. In such an embodiment, a third tri-chamber pen 80' may carry a variety of different combinations of ink formulations, such as, the primary colors (red, green and blue). This third tri-chamber pen 80' may also be a second full color cartridge, or of another concentration of a reduced dye load. For instance, such a three tri-chamber pen carriage may carry one full color pen 62, and two imaging pens 80 and 80', with one carrying ink formulations having a 10% colorant concentration, and the other having a 40% concentration. It is apparent that a variety of different combinations of colors and concentrations may be used in the ink formulations of the imaging cartridge 80, 80'.

The following Tables 1 and 2 list a variety of different interchangeable pen and ink formulation combinations, which may be implemented using the concepts described above to provide a dual (or multiple) personality printer, capable of producing a variety of different types of output, each with outstanding print quality.

TABLE 1

Two Pen Carriage Ink Formulation Combinations

| Options | Interchangeable Carriage Position | | Other Position |
|---|---|---|---|
| | First Cartridge | Second Cartridge | Third Cartridge |
| Business | True Black | Partial C, M & Gray | Full C, M, Y |
| Imaging 1 | — | Partial C, M & True Black | Full C, M, Y |
| Imaging 2 | — | Partial C, M, Y | Full C, M, Y |
| Imaging 3 | — | Partial R, G, B | Full C, M, Y |
| Imaging 4 | — | Full R, G, B | Full C, M, Y |
| Imaging 5 | — | Gray | Full C, M, Y |
| Imaging 6 | — | Partial C, M, Y & True Black | Full C, M, Y |
| Imaging 7 | — | Partial C, M, Gray & True Black | Full C, M, Y |

TABLE 2

Three Pen Carriage Ink Formulation Combinations

| Options | Interchangeable Carriage Position | | Other Position | Other Position |
|---|---|---|---|---|
| | First Cartridge | Second Cartridge | Third Cartridge | Fourth Cartridge |
| Business & Imaging | Partial C, M, Gray | — | Full C, M, Y | True Black |
| Imaging 8 | — | Partial C, M, Y | Full C, M, Y | True Black |
| Imaging 9 | — | Full C, M, Y | Full C, M, Y | True Black |
| Imaging 10 | — | Partial R, G, B | Full C, M, Y | True Black |
| Imaging 11 | — | Full R, G, B | Full C, M, Y | True Black |
| Imaging 12 | — | Gray | Full C, M, Y | True Black |
| Imaging 13 | — | Partial First % Colorant | Partial Second % Colorant | True Black |
| Imaging 14 | — | Partial First % Colorant | Partial Second % Colorant | Full C, M, Y |

Advantages

The imaging cartridge system described above with respect to FIGS. 2 and 3, as well as the embodiments illustrated in Table 1, advantageously allows previously developed pen architecture to be used, for instance, the imaging cartridge 80 may be constructed in substantially the same fashion as the tri-compartment full color pen 62. This is particularly advantageous because existing drop volumes and other parameters may be used, albeit with a reduced colorant concentration content for the imaging pen 80. Using an existing pen architecture provides for very minor ink changes, that is no new formulations, only a lower concentration of dye or pigment in the imaging cartridge 80. Using existing pen architectures allows production of economical printing mechanisms, at a more attractive price for consumers than if totally new architectures where required. Thus, use of the illustrated embodiment leverages off of existing technology which is proven and accepted in the industry, while providing significant image quality improvements.

Moreover, use of the interchangeable imaging cartridge system proposed herein provides imaging capability for those consumers wishing to pay for it initially, while providing a dual pen (four ink chamber) system for those consumers who primarily print black text or simple plain paper graphics. This system also accommodates those consumers who may initially have no need for, or not wish to invest in, an imaging system, but desire to have the ability to upgrade in the future. The ability to convert from an imaging print mode, using cartridge 80, back to the black and full-color cartridges 60, 62 facilitates faster black text printing (i.e., higher "throughput," which is typically measured in pages per minute). Using the dedicated black ink cartridge 60, particularly when filled with pigment-based ink, provides a crisper, sharper black when using plain paper (i.e., paper which has no special coating or treatment for enhanced compatibility with any particular type of ink).

As a further advantage, the print quality achieved during trial runs of the illustrated imaging cartridge system yielded near-continuous tone images using the inkjet printer 20. Indeed, these near-continuous tone images provided by printer 20 where achieved using a variety of different types of print media, including specially coated paper, bond paper and plain paper.

Use of the imaging cartridge system of the present invention also provides for a faster printed image, as compared to binary printers of equal print quality. This is because the imaging system described herein requires less data to achieve near-photographic quality images, than the data required for earlier high resolution binary printers. This faster image rendering can enhance the throughput of the printer, that is, the rating of printer speed in pages per minute.

Furthermore, the superior images which are achievable using the imaging cartridge system described herein are provided at a lower addressability than traditional "binary" inkjet printing. For example, the visual equivalent of a 1200 dpi (dots-per-inch) rated image printed with full colorant concentrations of black, cyan, yellow and magenta, can be accomplished using the imaging system described herein but at a lower rating of 300 dpi. This feature then places less stringent requirements on the mechanism accuracy, when compared to the earlier full colorant concentration 1200 dpi systems which had to place smaller dots at higher resolutions to achieve this high visual quality. Thus, using the imaging system described herein, superior images are achievable using a more economically designed printer product, with comparable specifications to currently-produced, low-cost, binary inkjet printers.

We claim:

1. An inkjet printing mechanism for printing an image, comprising:

at least two inkjet cartridges comprising:
   (1) either one of:
      (a) a first cartridge responsive to a first firing signal for monochrome printing, or
      (b) a second cartridge responsive to a second firing signal for multi-color printing, wherein the first cartridge contains a first ink formulation and the second cartridge contains a second ink formulation different from the first ink formulation, and
   (2) a third cartridge responsive to a third firing signal; and a carriage that receives the third cartridge, and that interchangeably receives the first cartridge or the second cartridge; and controller that generates the third firing signal, and that determines whether the first cartridge or the second cartridge is installed in the carriage, and then generates the first firing signal when the first cartridge is installed or the second firing signal when the second cartridge is installed.

2. An inkjet printing mechanism according to claim 1 wherein:

the inkjet printing mechanism further includes a fourth cartridge responsive to a fourth firing signal;

the carriage also receives the fourth cartridge; and the controller generates the fourth firing signal.

3. An inkjet printing mechanism according to claim 1 wherein the first and second cartridges each have at least one ink-containing chamber, with the first and second cartridges having a different number of ink-containing chambers.

4. An inkjet printing mechanism according to claim 1 wherein:

the first cartridge has at least one chamber containing the first ink formulation which comprises a first color; and the second cartridge has at least one chamber containing the second ink formulation which comprises a second color.

5. An inkjet printing mechanism according to claim 4 wherein the second cartridge has at least two chambers one of which contains a third ink formulation which comprises a third color.

6. An inkjet printing mechanism according to claim 5 wherein the second cartridge has at least three chambers one of which contains a fourth ink formulation which comprises a fourth color.

7. An inkjet printing mechanism according to claim 1 wherein:

the first cartridge has at least one chamber containing the first ink formulation which comprises a first colorant concentration; and the second cartridge has at least one chamber containing the second ink formulation which comprises a second colorant concentration.

8. An inkjet printing mechanism according to claim 7 wherein the second cartridge has at least two chambers one of which contains a third ink formulation which comprises a third colorant concentration.

9. An inkjet printing mechanism according to claim 8 wherein the second cartridge has at least three chambers one of which contains a fourth ink formulation which comprises a fourth colorant concentration.

10. An inkjet printing mechanism according to claim 9 wherein the second, third and fourth colorant concentrations are substantially equal within the second cartridge.

11. An inkjet printing mechanism according to claim 9 wherein the second, third and fourth colorant concentrations within the second cartridge are less than the first colorant concentration within the first cartridge.

12. An inkjet printing mechanism according to claim 9 wherein:

the first cartridge has only one chamber; and the second, third and fourth colorant concentrations within the second cartridge are lesser than the first colorant concentration within the first cartridge.

13. An inkjet printing mechanism according to claim 9 wherein:

the third cartridge has at least three chambers containing ink formulations of fifth, sixth and seventh colorant concentrations; and within the second cartridge, the second, third and fourth colorant concentrations are less than the fifth, sixth and seventh colorant concentrations within the third cartridge.

14. An inkjet printing mechanism according to claim 1 wherein:

the first cartridge has only one chamber containing said first ink formulation of a first colorant concentration comprising a first color; and the second cartridge has at least three chambers each containing one of a second colorant concentration, a third colorant concentration, and a fourth colorant concentration.

15. An inkjet printing mechanism according to claim 14 wherein the third cartridge has at least three chambers each containing a different ink formulation of a fifth colorant concentration, a sixth colorant concentration, and a seventh colorant concentration.

16. An inkjet printing mechanism according to claim 15 wherein:

within the third cartridge, the fifth colorant concentration comprises a second color, the sixth colorant concentration comprises a third color, and the seventh colorant concentration comprises a fourth color; and within the second cartridge, the second colorant concentration comprises the second color, and the third colorant concentration comprises the third color.

17. An inkjet printing mechanism according to claim 16 wherein within the second cartridge, the second and third colorant concentrations are each less than the respective fifth and sixth colorant concentrations within the third cartridge.

18. An inkjet printing mechanism according to claim 16 wherein within the second cartridge, the fourth colorant concentration comprises the fourth color, with the fourth colorant concentration being less than the seventh colorant concentration within the third cartridge.

19. An inkjet printing mechanism according to claim 16 wherein:

the first color comprises black;

the second color comprises cyan;

the third color comprises magenta; and the fourth color comprises yellow.

20. An inkjet printing mechanism according to claim 16 wherein within the second cartridge, the fourth colorant concentration comprises the first color.

21. An inkjet printing mechanism according to claim 20 wherein within the second cartridge, the fourth colorant concentration is less than the first colorant concentration.

22. An inkjet printing mechanism according to claim 20 wherein within the second cartridge, the fourth colorant concentration is substantially equal to the first colorant concentration.

23. An inkjet printing mechanism according to claim 1 wherein:

the first cartridge and the second cartridge each have unique identifiers; and the controller is responsive to the unique identifiers to determine whether the first cartridge or the second cartridge is installed in the carriage.

24. A method of retrofitting an inkjet printing mechanism having a carriage that carries first and second cartridges, with the first cartridge carrying a first ink formulation of a selected colorant concentration and being responsive to a first firing signal, comprising the steps of:

providing a third cartridge which is responsive to a third firing signal, with the third cartridge having first and second chambers containing ink formulations of colorant concentrations different than said selected colorant concentration, with the first chamber containing a third ink formulation;

replacing the first cartridge in the carriage with the third cartridge;

recognizing the replacement of the first cartridge with the third cartridge; and in response to the recognizing step, generating the third firing signal for the third cartridge.

25. A method according to claim 24, wherein:

the first cartridge has at least one chamber containing the first ink formulation; and the second chamber of the third cartridge contains a fourth ink formulation.

26. A method according to claim 24, wherein:

the first cartridge has at least one chamber containing the first ink formulation; and the third cartridge further has a third chamber, with the second chamber containing a fourth ink formulation, and the third chamber containing a fifth ink formulation.

27. A method according to claim 24, wherein:

the first ink formulation is of a first color; and the replacing step comprises replacing the first cartridge with the third cartridge which has the first and second chambers containing ink formulations of colors different than the first color.

28. A method according to claim 24, wherein the colorant concentrations of at least two ink formulations within the third cartridge are less than said selected colorant concentration of the first ink formulation.

29. A method according to claim 24, wherein:

the first ink formulation is of a first color; and the replacing step comprises replacing the first cartridge with the third cartridge which has at least two chambers containing ink formulations of colors different than the first color.

30. An inkjet printing mechanism for interchangeably printing a first image with four different colorants and a second image with six different colorants, comprising:

a first inkjet cartridge having three reservoirs separately containing first, second and third colors of ink, with the ink of the first color having a selected colorant concentration, with the first inkjet cartridge being responsive to a first firing signal;

either one of two interchangeable inkjet cartridges:

(a) a second cartridge responsive to a second firing signal and containing a fourth color of ink to print the first image, or (b) a third cartridge responsive to a third firing signal to print the second image, with the third cartridge having three reservoirs separately containing first, second and third ink formulations, with the first ink formulation comprising the first color of ink at a concentration less than said selected colorant concentration; and a carriage that receives the first cartridge, and that interchangeably receives the second cartridge or the third cartridge; and controller that generates the first firing signal, and that determines whether the second cartridge or the third cartridge is installed in the carriage, and then generates the second firing signal when the second cartridge is installed or the third firing signal when the third cartridge is installed.

31. An inkjet printing mechanism according to claim 31 wherein:

said selected colorant concentration comprises a first colorant concentration;

the second color of ink contained in first inkjet cartridge has a second colorant concentration different from said first colorant concentration; and the second ink formulation contained in third inkjet cartridge comprises the second color of ink at a concentration less than the second colorant concentration.

32. An inkjet printing mechanism according to claim 30 wherein:

said selected colorant concentration comprises a first colorant concentration;

the fourth color of ink contained in second inkjet cartridge has a second colorant concentration different from said first colorant concentration; and the third ink formulation contained in third inkjet cartridge comprises the fourth color of ink at a concentration less than the second colorant concentration.

33. An inkjet printing mechanism according to claim 30 wherein:

said selected colorant concentration comprises a first colorant concentration;

the fourth color of ink contained in second inkjet cartridge has a second colorant concentration different from said first colorant concentration; and the third ink formulation contained in third inkjet cartridge comprises the fourth color of ink at a concentration substantially equal to the second colorant concentration.

34. An inkjet printing mechanism according to claim 30 wherein:

the first color of ink comprises cyan;

the second color of ink comprises magenta;

the third color of ink comprises yellow; and the fourth color of ink comprises black.

35. An inkjet printing mechanism according to claim 1 wherein:

the first ink formulation comprises a first color of a first colorant concentration;

the second cartridge has plural reservoirs one of which contains the second ink formulation of a second color at a second colorant concentration, with another of the plural reservoirs containing a third ink formulation of a third color at a third colorant concentration; and the third cartridge has plural reservoirs one of which contains a fourth ink formulation of the second color at a fourth colorant concentration different from the second colorant concentration, with another of the plural reservoirs of the third cartridge containing a fifth ink formulation of the third color at a fifth colorant concentration different from the third colorant concentration.

36. An inkjet printing mechanism according to claim 35 wherein:

the second colorant concentration of the second color in the second cartridge is less than the fourth colorant concentration of the second color in the third cartridge; and the third colorant concentration of the third color in the second cartridge is less than the fifth colorant concentration of the third color in the third cartridge.

37. An inkjet printing mechanism according to claim 35 wherein:

the second cartridge has a further one of the plural reservoirs one containing a sixth ink formulation of a fourth color at a sixth colorant concentration; and the third cartridge has a further one of the plural reservoirs one containing a seventh ink formulation of the fourth color at a seventh colorant concentration different from the sixth colorant concentration.

38. An inkjet printing mechanism according to claim 35 wherein the second cartridge has a further one of the plural reservoirs one containing a seventh ink formulation of the first color at a seventh colorant concentration different from the first colorant concentration.

39. An inkjet printing mechanism according to claim 38 wherein the seventh colorant concentration of the first color in the second cartridge is less than the first colorant concentration of the first color in the first cartridge.

* * * * *

UNITED STATES PATENT AND TRADEMARK OFFICE
CERTIFICATE OF CORRECTION

PATENT NO. : 5,742,306
DATED : April 21, 1998
INVENTOR(S) : Gompertz et al

It is certified that error appears in the above-identified patent and that said Letters Patent is hereby corrected as shown below:

Column 1, (line 65), delete "inkier" and insert therefor --inkjet--.

Column 2, (line 37), delete "priming" and insert therefor --printing--.

Column 3, (line 51), delete "inkier" and insert therefor --inkjet--.

Column 4, (line 15), delete "outpost" and insert therefor --output--.

In the Claims

Column 10, (line 66), delete "inkier" and insert therefor --inkjet--.

Column 13, (line 17), delete second "31" and insert therefor --30--.

Signed and Sealed this

Fifteenth Day of December, 1998

*Attest:*

BRUCE LEHMAN

*Attesting Officer*         *Commissioner of Patents and Trademarks*